United States Patent [19]

Spykerman

[11] Patent Number: 5,511,755
[45] Date of Patent: Apr. 30, 1996

[54] RESILIENT CONTAINER HOLDER

[75] Inventor: David J. Spykerman, Zeeland, Mich.

[73] Assignee: Prince Corporation, Holland, Mich.

[21] Appl. No.: 318,469

[22] Filed: Oct. 5, 1994

[51] Int. Cl.$^6$ ....................................... A47K 1/08
[52] U.S. Cl. ............... 248/311.2; 220/23.8; 220/575; 220/902; 224/926; 297/188.14
[58] Field of Search ................ 248/311.2, 312, 248/313, 314, 316.2, 316.3, 309.1; 296/37.8, 37.14; 220/575, 23.8, 902; 224/42.42; 247/188.14

[56] References Cited

U.S. PATENT DOCUMENTS

| | | | |
|---|---|---|---|
| 4,271,878 | 6/1981 | Bologa | 248/311.3 X |
| 4,728,018 | 3/1988 | Parker . | |
| 4,738,423 | 4/1988 | DiFilippo et al. | 248/311.2 |
| 4,756,572 | 7/1988 | Dykstra et al. . | |
| 4,818,017 | 4/1989 | Dykstra et al. . | |
| 4,854,468 | 8/1989 | Dahlquist, II et al. . | |
| 5,087,008 | 2/1992 | Miller et al. | 248/311.2 |
| 5,102,085 | 4/1992 | Wieczorek et al. | 248/311.2 |
| 5,165,646 | 11/1992 | Gewecke | 248/311.2 |
| 5,170,980 | 12/1992 | Burrows et al. | 248/311.2 |
| 5,280,848 | 1/1994 | Moore | 248/311.2 X |
| 5,330,145 | 7/1994 | Evans et al. | 248/311.2 |
| 5,330,146 | 7/1994 | Spykerman | 248/311.2 |

*Primary Examiner*—Ramon O. Ramirez
*Attorney, Agent, or Firm*—Price, Heneveld, Cooper, DeWitt & Litton

[57] ABSTRACT

A container holder for a vehicle includes a flat panel section defining a marginal flange for engaging a mating structure on a vehicle component, such as an armrest or a floor console, and one or more cup-shaped members. The cup-shaped members include a floor and a resilient sidewall which can be resiliently flexed to move the floor between a lowered position and a raised position. In the lowered position, the cup-shaped member forms a shallow depression shaped to receive and stably support a first container. In the raised position, an aperture in the floor of the cup-shaped member receives a smaller diameter container such that the marginal material forming the aperture supports the sides of the container.

23 Claims, 1 Drawing Sheet

RESILIENT CONTAINER HOLDER

BACKGROUND OF THE INVENTION

The present invention relates to a container holder for vehicles, and more particularly a container holder for holding containers of different sizes.

Containers come in a variety of shapes and sizes. Vehicle container holders are often adjustable so that they can stably support differently sized containers, however, in order to be adjustable, container holders frequently include multiple moving parts and are expensive to manufacture, assemble and are subject to breakage, thus requiring maintenance. Such moveable parts often squeak, rattle or make other annoying noises that are unacceptable in the relatively quiet interior passenger compartments of higher priced vehicles.

Thus, there exists a need for a container holder that is adjustable, aesthetically acceptable in appearance and quiet to solve the aforementioned problems.

SUMMARY OF THE INVENTION

A container holder includes a resilient member including at least one cup-shaped member with a floor having an opening. The sides of the cup-shaped member resiliently flex over-center between a first position forming a container holder for a first sized container and a second position forming a container holder for a second sized container. In a preferred form, the container holder is integrally made of resilient material, thus eliminating assembly of multiple parts and also eliminating any chance of rattling the container holder so formed.

These and other features, objects and advantages of the present invention will be further understood by reference to the following description, claims and appended drawings.

DETAILED DESCRIPTION OF THE PREFERRED EMBODIMENT

Figure 1:
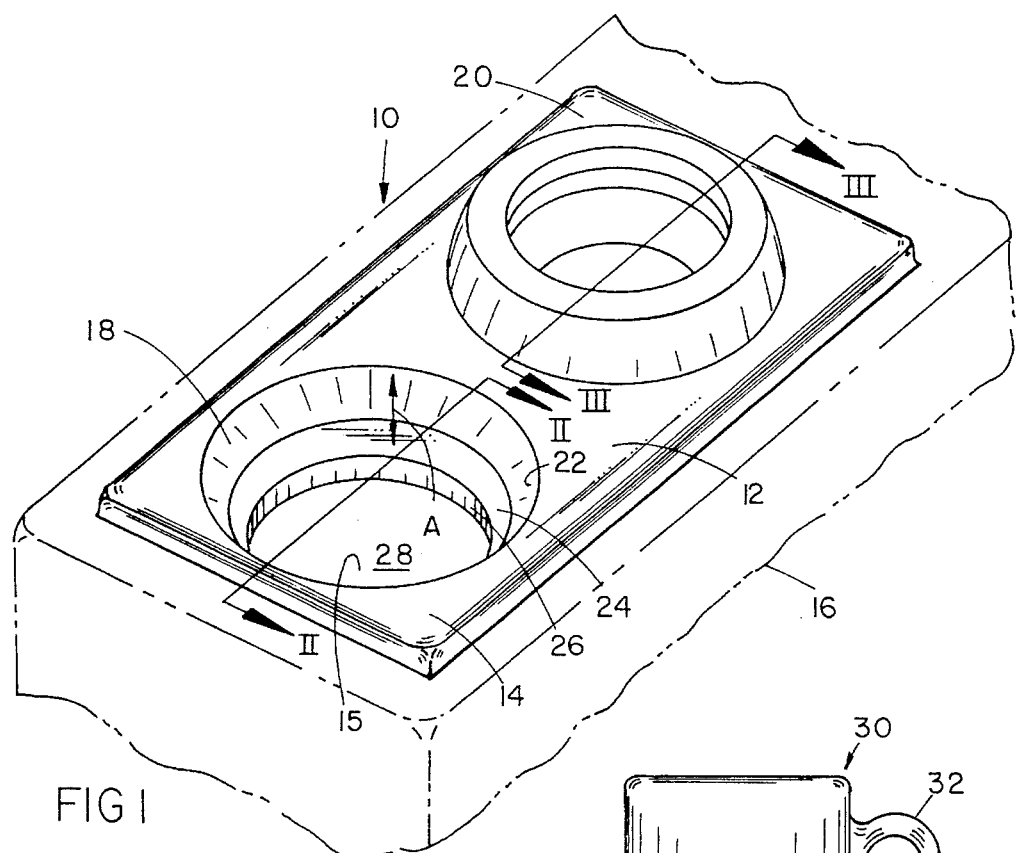
FIG. 1 is a fragmentary perspective view partly in phantom form of a vehicle console including a container holder embodying the present invention.

A container holder 10 (FIG. 1) embodying the present invention is a one-piece integrally molded part made from a rubber-like material such as natural rubber, neoprene or elastomer that can be resiliently flexed. The container holder 10 includes a generally horizontally extending support or panel section 12 that defines a marginal flange 14 for engaging a mating surface in a depression or pocket 15 in a vehicle console 16. It is further contemplated that the container holder 10 can be constructed to engage any mating component or components defining a recess or space, such as an armrest including an internal compartment, or a tray. Container holder 10 includes two cup-shaped members 18 and 20 integrally formed in spaced relationship within interior region of the panel section 12. Cup-shaped member 18 is identical to cup-shaped member 20 and therefore, only member 18 will be described hereinafter. In FIG. 1, member 18 is shown in a lowered recessed position for holding a larger diameter container, while member 20 is shown in a raised extended position for holding a smaller diameter container.

Figure 2:
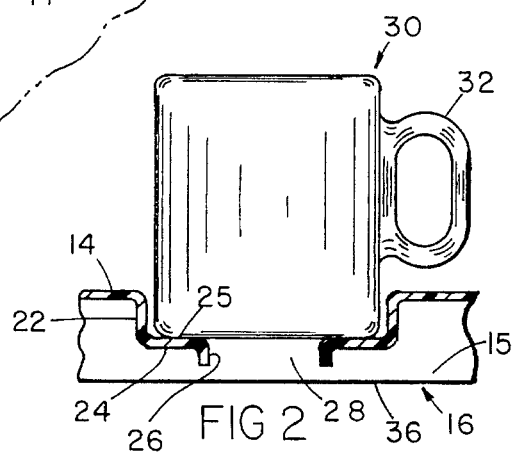
FIG. 2 is a fragmentary cross-sectional view taken along the plane II—II of FIG. 1.

Cup-shaped member 18 includes a cylindrical sidewall 22 and a moveable panel or floor 24 connected to the end of sidewall 22 opposite panel section 12. Floor 24 is defined by a ring of marginal material 26 having central aperture 28. Sidewall 22 can be flexed along the direction of arrow A in FIGS. 1 and 3 to move floor 24 to a lowered position (FIGS. 1 and 2). In the lowered position, sidewall 22 and floor 24 define a shallow depression for receiving and stably supporting a larger diameter container such as a mug 30 in a manner that does not interfere with mug handle 32. Notably, the upper surface 25 of the annular floor 24 supports the bottom of the mug while the side 22 has a diameter sufficiently large to receive mug 30. Material 26 can be designed to contact the floor 36 defined by console 16, or can be designed to be spaced therefrom.

Figure 3:
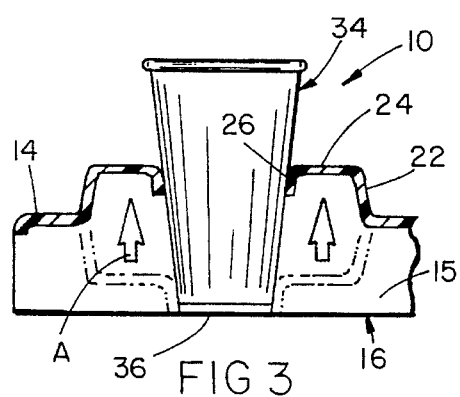
FIG. 3 is a fragmentary cross-sectional view taken along the plane III—III of FIG. 1.

Sidewall 22 can be resiliently flexed "over-center" to a raised position to stably support floor 24 in the raised position (FIG. 3). In the raised position, floor 24 extends above panel section 12. A smaller diameter container, such as a can or cup 34 can be extended through aperture 28 in floor 24. In this position, marginal material 26 supports the sides of cup 34 which has its bottom supported on the floor 36 of the console 16. The diameter of aperture 28 is smaller than the diameter defined by sidewall 22. Notably, aperture 28 is designed with a predetermined diameter so that it loosely engages the sides of container 34 having a standard dimension such as a beverage can. The bottom of container 34 rests on console floor 36.

In the illustrated embodiment, container holder 10 is an integral one-piece molded part defining two separate container holders. However, it is also contemplated that container holder 10 could be multi-piece. For example, panel section 12 and moveable floor 24 could be made of a rigid material, while sidewall 22 would be made of resilient material. It is also contemplated that sidewall 22 could include apertures such that it is not a continuous band of material, but rather is comprised of multiple bands of material extending from marginal flange 14 to moveable floor 24 as long as it retains its two stable use positions illustrated in FIGS. 2 and 3 by flexibly moving over-center.

Figure 4:
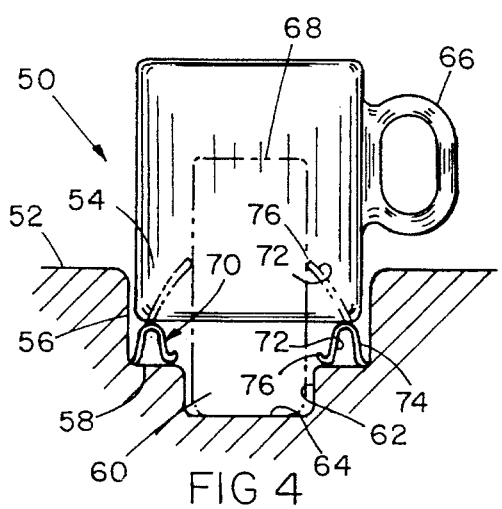
FIG. 4 is a fragmentary cross-sectional view partially in phantom of another container holder embodying the present invention.

Another container holder 50 (FIG. 4) embodying the present invention includes a support 52 defining a recess 54. It is contemplated that support 52 can be an armrest, a console, a dash, or other part in a vehicle. Recess 54 is defined by a cylindrically-shaped sidewall 56 and a first floor 58. A second recess 60 is located in floor 58 and defines a second cylindrically-shaped sidewall 62 and a second floor 64. The larger diameter sidewall 56 defines a first aperture for receiving, for example, a mug 66. The smaller diameter sidewall 62 defines a second aperture for receiving, for example, a soda can or glass 68.

A resilient ring-shaped member 70 is positioned on first floor 58. Ring-shaped member 70 comprises a sidewall 72 made from a rubber-like material that can be resiliently flexed over-center. One end 74 of member 70 defines a diameter about equal to the diameter of the first recess 54 such that it frictionally engages first sidewall 56. The other end 76 of member 70 defines a diameter about equal to the diameter of second recess 60.

Ring-shaped member 70 can be flexed to a lowered position (shown in solid lines in FIG. 4) wherein sidewall 72 is doubled over and the bottom of mug 66 rests on sidewall 72. Ring-shaped member 70 can also be flexed to a raised position (shown in phantom lines in FIG. 4) wherein end 76 is raised above first floor 58. In this raised position, end 76 will support the sides of the soda can or glass 68 to stabilize the soda can or glass 68 in second recess 60.

Thus, container holders are provided that are one-piece, easily manufactured and installed, and that are rattle and squeak-free. The container holders can be flexed between a lowered position for holding a container having a first size, and flexed to a raised position for holding a container having a second size.

From the foregoing description, it will be readily appreciated by those skilled in the art that modifications may be made to the invention without departing from the spirit or scope of the invention as defined by the appended claims.

The embodiments of the invention in which an exclusive property or privilege is claimed are defined as follows:

1. A container holder for a vehicle comprising:

a cup-shaped member including a section of resilient material shaped to flex over-center between a first position forming a first container holder and a second position forming a second container holder, the section of resilient material being configured to hold the cup-shaped member in the first position when moved to the first position and also being configured to hold the cup-shaped member in the second position when moved to the second position, so that the first and second container holders can be selectively formed as desired.

2. A container holder as defined in claim 1 wherein said first container holder and said second container holder define first and second apertures for receiving containers, said apertures being of different sizes.

3. A container holder as defined in claim 1 wherein said cup-shaped member includes a floor for supporting the bottom of a container.

4. A container holder as defined in claim 1 wherein said resilient member is constructed to mateably engage a depression in a vehicle component such as a floor console.

5. A container holder as defined in claim 1 and further including a flange extending from said cup-shaped member for engaging a mating flange on a support member such as a console.

6. A container holder as defined in claim 1 wherein said cup-shaped member includes a cylindrical sidewall, and wherein said section is raised when it is moved from said first position to said second position.

7. A container holder as defined in claim 1 and further including a second cup-shaped member that resiliently flexes over-center between a first position and a second position.

8. A container holder as defined in claim 1 wherein said cup-shaped member is shaped to stably support a first container when in said first position and to stably support a smaller diameter container when in said second position.

9. A container holder as defined in claim 1 and further including a flange extending from an edge of said cup-shaped member and shaped to engage an internal compartment of a vehicle armrest.

10. A container holder for a vehicle comprising:

a cup-shaped member including a section of resilient material shaped to flex over-center between a first position forming a first container holder and a second position forming a second container holder, said cup-shaped member including a floor for supporting the bottom of a container, said floor including an aperture formed therein.

11. A container holder for a vehicle comprising:

a support member defining a marginal region and an interior region; and a cup-shaped container holder connected to said support member and located in said interior region of said container holder including a sidewall made of a resilient material configured to resiliently flex and snap over-center between a raised position and a lowered position to define two different sized container supports.

12. A container holder as defined in claim 11 wherein said sidewall is generally cylindrical.

13. A container holder as defined in claim 12 wherein said sidewall is formed from a continuous uninterrupted band of material.

14. A container holder as defined in claim 11 including a second cup-shaped container holder connected to said support member, said second cup-shaped container holder including a second sidewall made of a resilient material capable of being resiliently flexed over-center between raised and lowered positions.

15. A container holder for a vehicle comprising:

a support including a sidewall and a floor defining a first container holder recess;

a resilient ring-shaped member positioned in said recess, said resilient member being flexibly movable over-center between a lowered position for supporting a first container and a raised position for supporting a second container; and a second recess located in said floor, said second recess including a secondary wall defining a smaller diameter than a diameter of said first recess, said first recess being configured to receive a bottom of said first container and said second recess being configured to receive a bottom of said second container, said first and second containers defining different diameters.

16. A container holder for a vehicle comprising:

a support including first marginal material defining a first aperture;

a panel including second marginal material defining a second aperture; and a sidewall member movably supporting said panel on said support for movement between a lowered position and a raised position, whereby, in the lowered position, a container can be stably supported on the panel within said first marginal material, and whereby, in the raised position, a second container can be stably supported in said second aperture within said second marginal material.

17. A container holder as defined in claim 16 wherein said panel is positioned above said support when in said raised position.

18. A container holder as defined in claim 16 wherein said sidewall member comprises a resilient material.

19. A container holder as defined in claim 18 wherein said sidewall material flexes over-center when said panel is moved between said raised position and said lowered position.

20. A container holder as defined in claim 16 wherein said sidewall member is generally cylindrical.

21. A container holder as defined in claim 16 wherein said sidewall member comprises a continuous band of material.

22. A container holder for a vehicle comprising:

a support including a sidewall and a floor defining a first container holder recess; and a resilient ring-shaped member positioned in said recess, said resilient member being flexibly movable over-center between a lowered position for supporting a first container and a raised position for supporting a second container, said resilient ring-shaped member including a resilient sidewall configured to support a bottom of said first container when in said lowered position and being configured to support a side of said second container when in said raised position.

23. A method of supporting containers of different sizes in a vehicle comprising steps of:

provviding a container holder made of a resilient material having a cup-shaped member; the resilient material being configured to flex over-center between a first position for holding a first container and a second position for holding a second container and being configured to hold the cup-shaped member in the first position or in the second position;

selectively flexing the cup-shaped member to the first position for holding the first container; and selectively flexing the cup-shaped member to the second position for holding the second container.

\* \* \* \* \*